(12) United States Patent
Svetlik et al.

(10) Patent No.: US 7,631,587 B2
(45) Date of Patent: Dec. 15, 2009

(54) FRONT-ACCESSIBLE BEVEL LOCKING SYSTEM

(75) Inventors: Kenneth Svetlik, Schaumburg, IL (US); Ezequiel Romo, Chicago, IL (US); Yi-Te Liao, Nan-Tou (TW); Chih-Yung Huang, Nan-Tou (TW)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/728,742

(22) Filed: Mar. 27, 2007

(65) Prior Publication Data

US 2007/0175305 A1      Aug. 2, 2007

Related U.S. Application Data

(63) Continuation of application No. 10/271,512, filed on Oct. 16, 2002, now Pat. No. 7,201,090.

(51) Int. Cl.
B27B 5/24      (2006.01)
(52) U.S. Cl. .................. 83/471.3; 83/477.1; 83/490; 83/581
(58) Field of Classification Search ............... 83/581, 83/471.3, 473, 477.1, 471, 471.2, 472, 477, 83/486.1, 490, 698.41, 477.2
See application file for complete search history.

(56) References Cited

U.S. PATENT DOCUMENTS

| 1,585,432 | A |   | 5/1926  | Stich |
| 3,011,531 | A |   | 12/1961 | Gaskell |
| 3,315,715 | A | * | 4/1967  | Mytinger ............... 83/477.2 |
| 3,596,548 | A |   | 8/1971  | Nagai et al. |
| 4,452,117 | A |   | 6/1984  | Brickner et al. |
| 4,553,462 | A |   | 11/1985 | Silken |
| 4,934,233 | A |   | 6/1990  | Brundage et al. |
| 5,042,348 | A |   | 8/1991  | Brundage et al. |
| 5,063,805 | A |   | 11/1991 | Brundage |
| 5,063,983 | A |   | 11/1991 | Barry |
| 5,078,373 | A |   | 1/1992  | Miller |
| 5,181,448 | A |   | 1/1993  | Terpstra |
| 5,235,889 | A |   | 8/1993  | Brickner et al. |
| 5,249,496 | A | * | 10/1993 | Hirsch et al. ............... 83/471.3 |
| 5,590,991 | A | * | 1/1997  | Garuglieri ................ 411/354 |
| 5,623,860 | A |   | 4/1997  | Schoene et al. |
| 5,778,747 | A |   | 7/1998  | Chen |
| 5,802,943 | A |   | 9/1998  | Brunson et al. |
| 5,862,734 | A |   | 1/1999  | Brunson et al. |
| 5,870,938 | A |   | 2/1999  | Brunson et al. |
| 5,870,939 | A |   | 2/1999  | Matsubara |
| 6,032,562 | A |   | 3/2000  | Brunson et al. |

(Continued)

FOREIGN PATENT DOCUMENTS

DE      295 02 550      4/1995

(Continued)

*Primary Examiner*—Stephen Choi
(74) *Attorney, Agent, or Firm*—Maginot, Moore & Beck

(57) ABSTRACT

A front-accessible bevel locking system for use with a power tool includes a mechanism for locking the power tool into a selected tilt or bevel position for bevel angle cuts. The bevel locking mechanism has a lever attached to a link rod by a cam mechanism such that, as the lever is moved to the locked position, the link rod holds a pivot support for the power tool at a bevel angle.

14 Claims, 4 Drawing Sheets

U.S. PATENT DOCUMENTS

| | | |
|---|---|---|
| 6,067,885 A | 5/2000 | Brunson et al. |
| 6,101,914 A | 8/2000 | Brunson et al. |
| 6,532,853 B1 | 3/2003 | Kakimoto et al. |
| RE38,094 E | 4/2003 | Buchalter |
| 6,658,977 B2 | 12/2003 | Chang |
| 6,662,697 B1 | 12/2003 | Chen |
| 6,675,685 B2 * | 1/2004 | Ceroll et al. ............... 83/477.2 |
| 2003/0024365 A1 | 2/2003 | Chang |
| 2003/0150311 A1 | 8/2003 | Carroll et al. |

FOREIGN PATENT DOCUMENTS

| | | |
|---|---|---|
| DE | 44 04 019 | 8/1995 |
| DE | 202 08 202 | 8/2002 |
| EP | 1 287 954 | 3/2003 |
| JP | 11 048029 | 2/1999 |

* cited by examiner

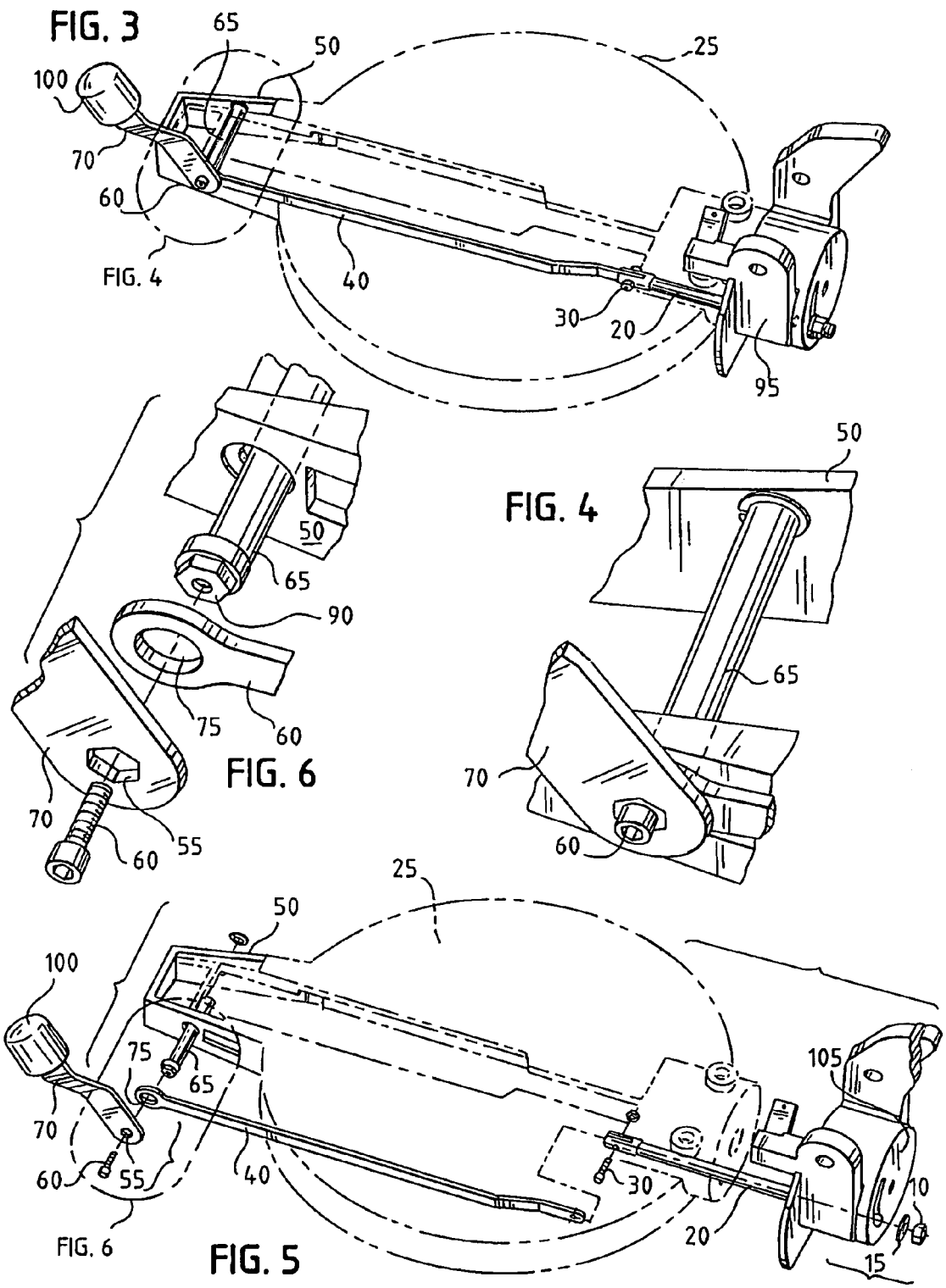

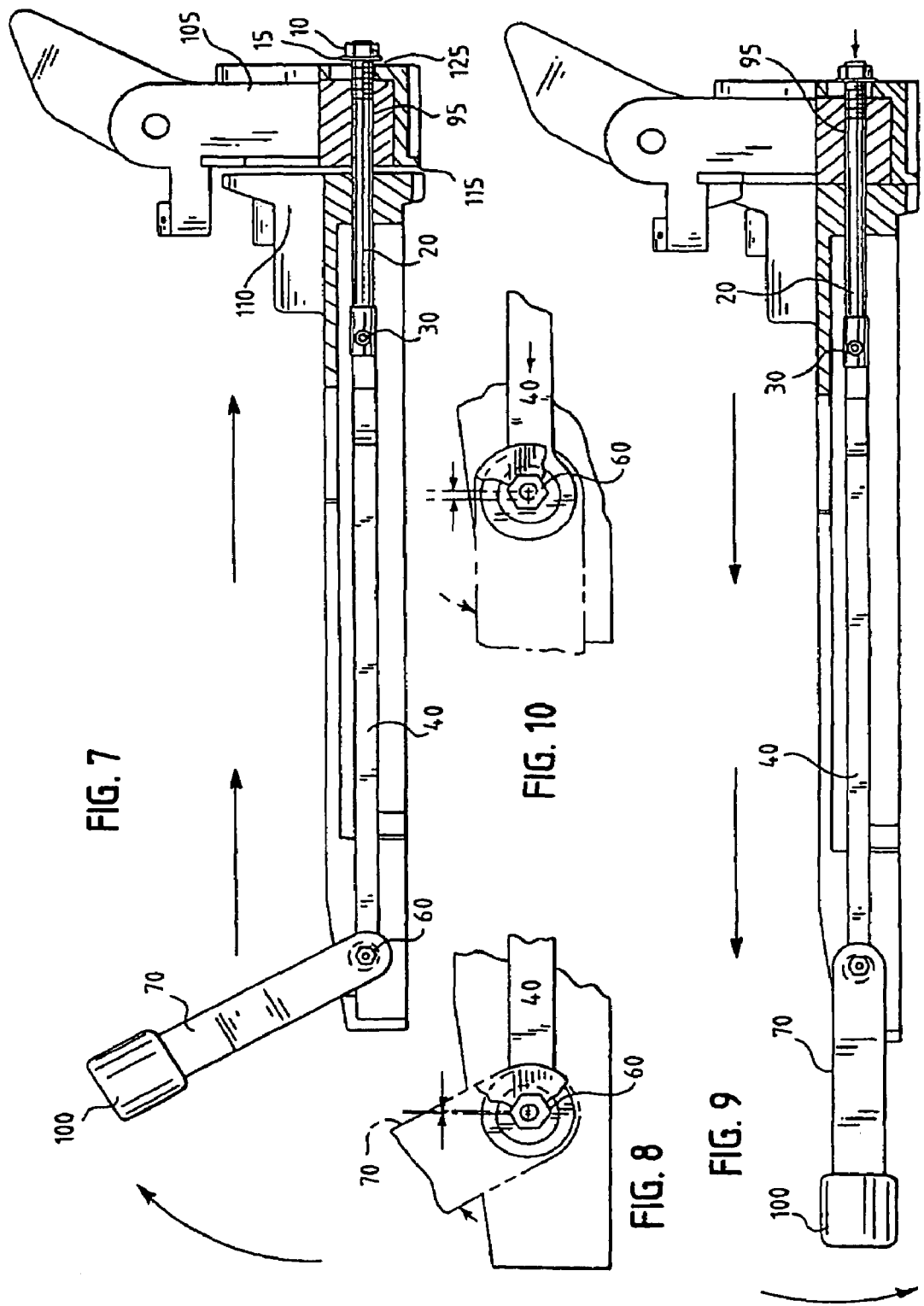

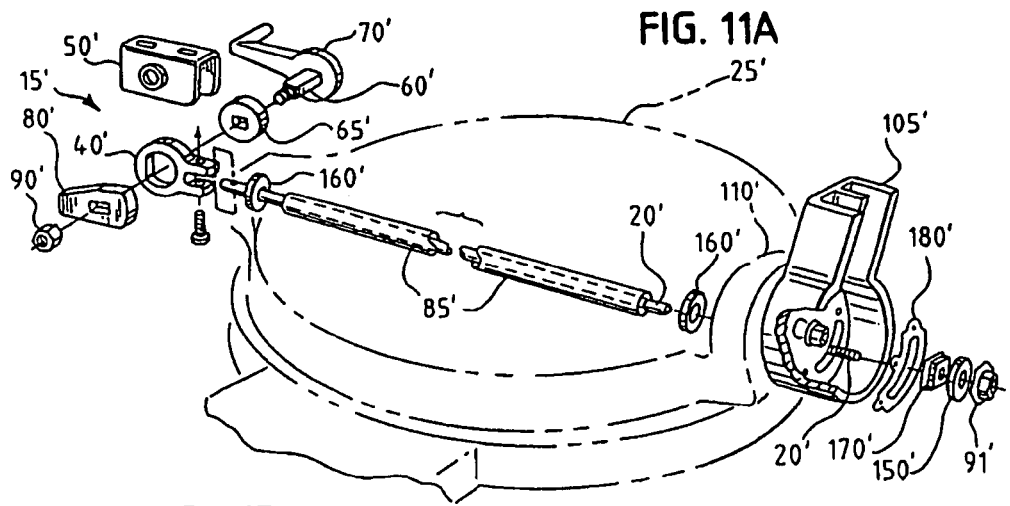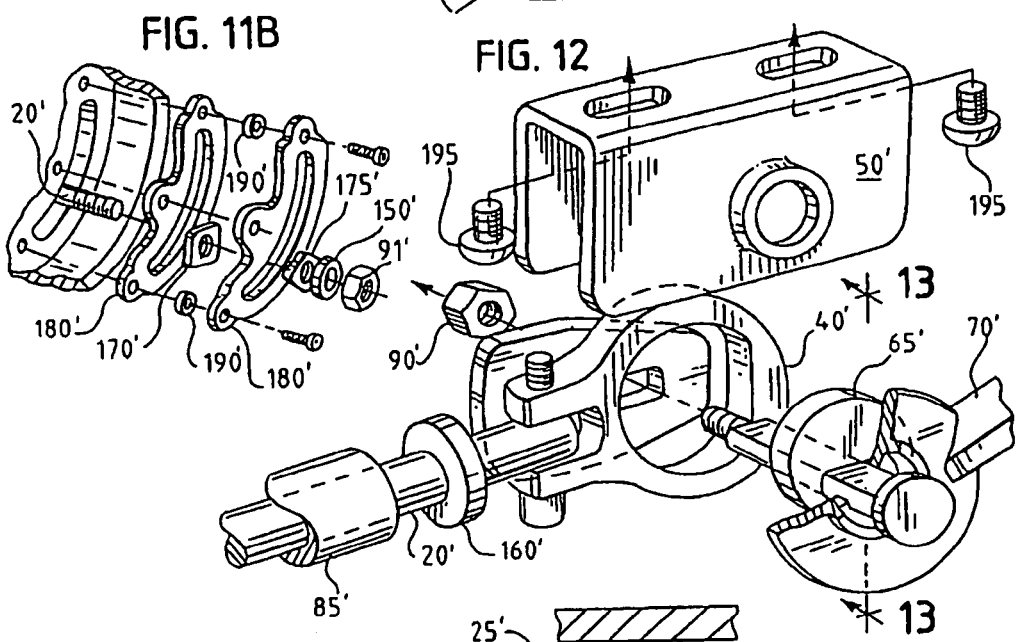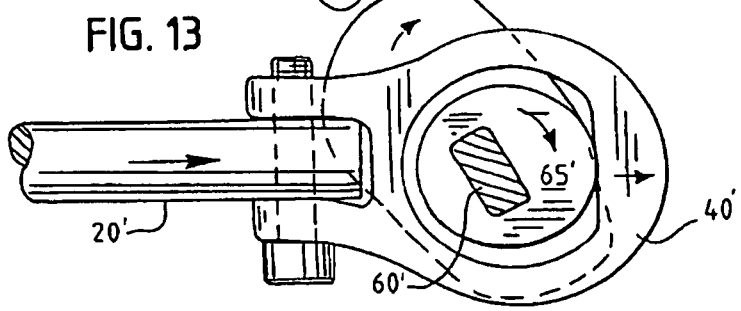

FRONT-ACCESSIBLE BEVEL LOCKING SYSTEM

This application is a continuation of co-pending application Ser. No. 10/271,512, filed on Oct. 16, 2002 (Patent Application Publication No. U.S. 2004/0074362 A1). The disclosure of the above-identified patent application is hereby totally incorporated by reference in its entirety.

FIELD OF THE INVENTION

The present invention relates generally to tilt locking mechanisms for power tools, and more specifically, to a bevel locking system accessible from the front side of a power tool, which is capable of holding the power tool in a tilted position for bevel angle cuts.

BACKGROUND OF THE INVENTION

Many power tools, such as mills, drill presses, or miter saws, are capable of producing a cut or hole to a work piece placed against a horizontal table beneath a power drill or saw. Some power tools, such as miter saws, have a rotatable horizontal table for making vertical cuts to a work piece at various angles. A vertical cut made at such an angle is called a "miter cut".

Some power tools, such as compound miter saws, have a capability for tilting a blade of the compound miter saw in a specific direction (usually, counter-clockwise) in order to make cuts at an acute angle to the vertical, generally from 0° to 45° (left of vertical for the user when facing the front end of the compound miter saw). A cut made with the blade tilted at an angle to the vertical (i.e., at a "bevel angle") is called a "bevel cut".

Still other power tools, such as dual bevel compound miter saws, have a capability for tilting the blade of the dual bevel compound miter saw both counter-clockwise and clockwise to an acute angle, generally from 0° to 45° either left or right of vertical. Dual bevel compound miter saws allow for a wider variety of bevel cuts by allowing the saw to tilt to a wider variety of bevel angles.

Bevel locking mechanisms are used to secure a tilted blade or drill at a particular bevel angle. There are conventional methods used for locking a tool at a particular bevel angle. However, there is a significant disadvantage to conventional methods in that conventional bevel locking systems have been generally located at the rear and of a cutting tool, away from a user. The user is thereby forced to reach over or behind the cutting tool in order to engage a bevel locking mechanism. The inaccessible location of conventional bevel locking mechanisms is both an inconvenience and a threat to user safety: these are significant disadvantages to heavy users of a conventional power tool, such as a miter saw.

U.S. Pat. No. 4,934,233 to Brundage et al. ("Brundage") is representative of such prior art devices, disclosing an arrangement in which the miter angle for a cut may be adjusted using a handle located at the front of a compound miter saw (labeled 11 in FIG. 1 of Brundage). Adjustment of a bevel angle however, unlike that of the position of a cut, is accomplished through a bevel locking handle (labeled 27 in FIG. 2 of Brundage) located at the back of the compound miter saw. The bevel locking handle may be loosened to allow the upper blade and housing to be tilted about a bevel axis. After a bevel angle position has been selected, rotational movement of the bevel locking handle locks the saw at a particular bevel angle.

Also representative of the prior art is U.S. Pat. No. 5,235,889 to Brickner et al. ("Brickner"), which discloses a biasing system for locking a saw at a particular bevel angle for bevel cuts. In this biasing system, a handle (labeled 78 in FIG. 3 of Brickner) is provided, again at the rear of the device for locking the blade at a particular bevel angle. The handle system (shown in FIG. 7 of Brickner) uses a male and female conical taper structure, whereby the female structure is urged toward the male structure, eventually bringing the two into contact. As contact is established, the bevel angle is locked.

There is, therefore, a need for a bevel locking system whereby a user can change the bevel angle of a cutting tool with a mechanism disposed toward the front end of the tool.

BRIEF SUMMARY OF THE INVENTION

The present invention provides a bevel locking system with a quick release bevel lock lever, which is located toward the front end of a power tool. The bevel lock lever may be attached to a side of a support arm used for adjusting another angle, such as a miter angle, of the power tool.

Several different versions and embodiments of the invention have been contemplated. In a first embodiment, the present invention includes a knobbed handle connected to a bevel lock lever. The knobbed handle is mounted to the right side of the support arm for the power tool in this embodiment. The bevel lock lever is rotatably mounted to a cam shaft along a cam axis. The cam shaft has a cylindrical shape, but is slightly offset from the cam axis, so that as the cam shaft rotates around the cam axis, the radial distance of the edge of the cam shaft from the cam axis varies. A cam shaft follower is mounted around the cam shaft in the first embodiment, so that rotation of the cam shaft around the cam axis with the bevel lock lever causes the cam shaft follower to shift axially. In the first embodiment, as the cam shaft follower is pulled axially forward (when the bevel lock lever is pressed downwardly), a link rod connected to the cam shaft follower is also pulled axially forward. A flanged nut at the end of the link rod pulls the pivot support housing up against the worktable, preventing the pivot support housing from pivoting around the bevel axis.

In a second embodiment, the present invention includes many of the same components. However, in the second embodiment, the link rod extends beneath substantially the entire width of the worktable rather than the cam shaft follower. In the second embodiment, the cam shaft follower (called a "cam follower" in referring to the second embodiment) has two prongs to which the link rod is bolted. Optionally, the link rod may be surrounded by a pipe, which advantageously provides additional mechanical support to the worktable.

The cam shaft follower and the cam follower are very similar in function, as suggested by the similarity of the given names. The differences are primarily structural. For ease of explanation of the two embodiments, however, different names have been adopted.

The interior of the cam follower is not circular as the interior of the cam shaft follower, but rather has a D-like shape. In addition, there is no cam shaft in the second embodiment; rather, a cam collar is mounted to a cam pin which extends along the length of the cam axis. The cam collar has an eccentric shape, and though the cam collar is not offset from the cam axis as the cam shaft was in the first embodiment, the eccentric shape of the cam collar results in a variable distance between the cam axis and the edge of the cam collar as the cam axis is rotated. As a result of this variable distance, the movement of the cam follower in the second embodiment as the cam axis is rotated is very similar to the movement of the cam shaft follower as the cam axis is rotated in the first embodiment: as the cam axis is rotated, the cam follower/cam shaft follower moves axially, shifting the link rod axially, and applying pressure to the pivot support housing sufficient to prevent movement of the power tool around the bevel axis.

The second embodiment also includes a lever stop mounted to the cam pin (on the cam axis) on a side of the cam follower away from the bevel lock lever. The lever stop hits the worktable when the bevel lock lever rotates the cam pin beyond a certain angle in either a clockwise or a counter-clockwise direction so that the bevel lock lever does not hang loose when not in the locked position.

Finally, the second embodiment also includes a combination of flanged nut and lock nut at the end of the link rod of the second embodiment. The lock nut can be adjusted to move the flange nut either closer to the outside plate of the pivot support housing or further away, effectively increasing or decreasing the pressure applied to the pivot support housing when the bevel lock lever is moved into the locked position. The flanged nut may also have two layers, with a first layer closest to the outside plate of the pivot support housing having a compressible material specially adapted to increase the tension between the pivot support housing and the flanged nut.

Alternatively, the second embodiment may include one or more bearing plates and one or more brake pads at the end of the link rod of the second embodiment. In an embodiment in which there are two break pads, the lock nut presses a washer against an outer brake pad when the link rod is pulled towards the user, flexing an outer bearing plate against an inner brake pad. The inner brake pad contacts the inner bearing plate so that, finally, all parts are compressed together against the outside plate of the pivot support housing. An assembly with only one break pad and one bearing plate may accomplish a similar result. In some embodiments the outer brake pad, or both the inner brake pad and the outer brake pad, are made of a high-friction composite material, for example, an asbestos-steel composite. Such composites are commonly used in automobile brake shoes.

BRIEF DESCRIPTION OF THE DRAWINGS

The foregoing and other objects, advantages, and features of the present invention will be apparent from the following detailed description and the accompanying drawings, in which:

FIG. 3 is a partial perspective view of a bevel locking system for use with a cutting tool, in accordance with an embodiment of the present invention;

FIG. 4 is a partial perspective view of the bevel locking system of FIG. 3, in accordance with an embodiment of the present invention;

FIG. 5 is an exploded perspective view of a bevel locking system of FIG. 3, in accordance with an embodiment of the present invention;

FIG. 6 is an exploded perspective view of the portion of a bevel locking system indicated in FIG. 4, in accordance with an embodiment of the present invention;

FIG. 7 is a side view of the bevel locking system of FIG. 3 in an unlocked position, in accordance with an embodiment of the present invention;

FIG. 8 is a partial cutaway view from a side of the portion of a bevel locking system of FIG. 7 in an unlocked position, in accordance with an embodiment of the present invention;

FIG. 9 is a side view of the bevel locking system of FIG. 3 in a locked position, in accordance with an embodiment of the present invention;

FIG. 10 is a partial cutaway view from a side of a portion of a bevel locking system of FIG. 9 in a locked position, in accordance with an embodiment of the present invention;

FIG. 11A is a perspective view of a partially disassembled bevel locking system, in accordance with a second embodiment of the present invention;

FIG. 11B is a perspective view of a partially disassembled bevel locking system, in accordance with a different version of a second embodiment of the present invention;

FIG. 12 is a perspective view of a portion of a bevel locking system indicated in FIGS. 11A-B, in accordance with a second embodiment of the present invention; and FIG. 13 is a side view of a cam collar and cam follower of a bevel locking system, in accordance with a second embodiment of the present invention.

DETAILED DESCRIPTION OF THE INVENTION

In all of the embodiments shown in the figures, the invention is provided in a dual bevel compound miter saw. However, as will be recognized by those of skill in the art, there is nothing to prevent the invention as described and disclosed herein from being incorporated in a different power tool in which there is also an advantage to be gained by providing a tilt or bevel angle locking system accessible from the front end of the power tool.

Figure 1:
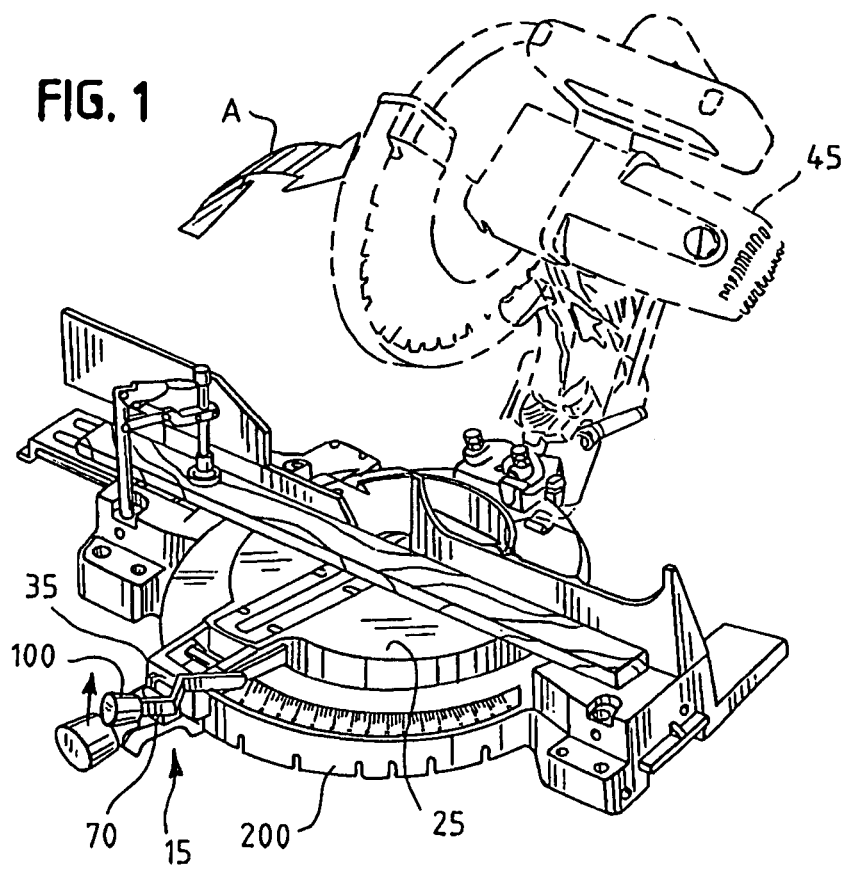
FIG. 1 is a perspective view of a bevel locking system in an unlocked position illustrating a tilting or bevel movement of a cutting tool, in accordance with an embodiment of the present invention.
Figure 2:
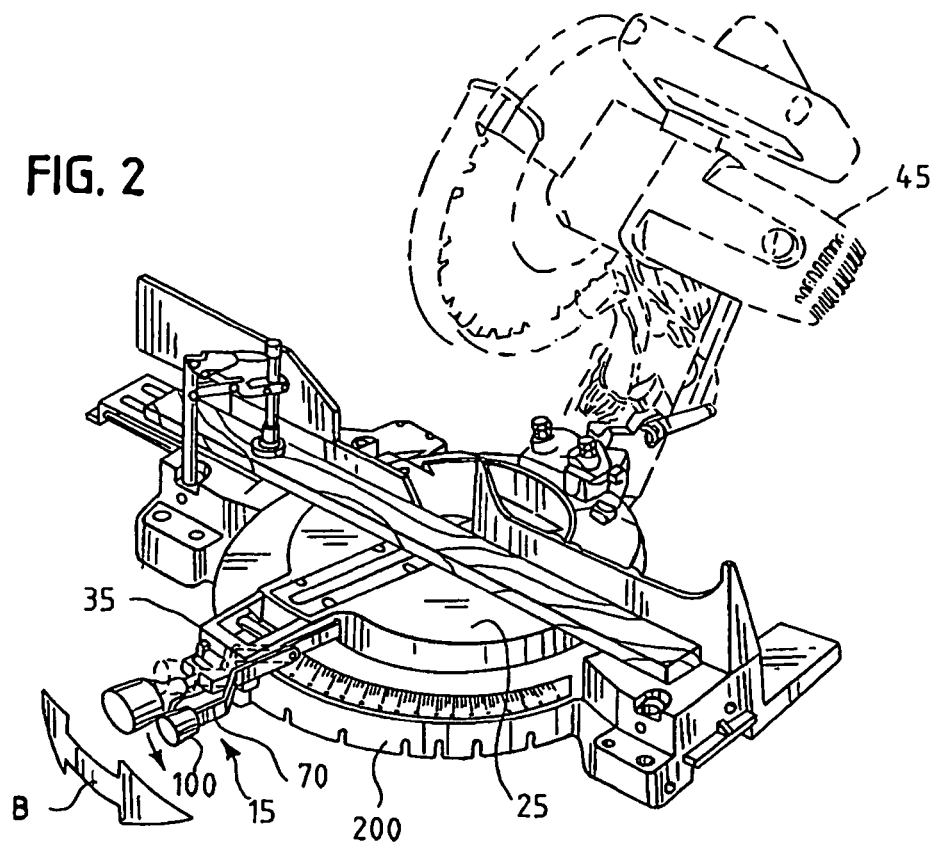
FIG. 2 is a perspective view of a bevel locking system in a locked position for use with a cutting tool, in accordance with an embodiment of the present invention.

FIGS. 1-2 provide a general understanding of how a bevel locking system functions to hold a tilt or bevel angle for a power tool. In FIGS. 1-2, there is illustrated, in accordance with a first embodiment of the present invention, a bevel locking system 15 for holding a power tool 45 at a selected bevel or tilt angle for making a bevel cut. The movement of the power tool 45 along the bevel or tilt angles is indicated by a curved arrow A in FIG. 1. When the bevel lock lever 70 is unlocked, as in the embodiment shown in FIG. 1, the power tool 45 is free to pivot in the direction indicated by the curved arrow A. When the bevel lock lever 70 is locked, as in the embodiment shown in FIG. 2, the power tool 45 is held steady at a selected bevel angle. In the embodiment shown in FIG. 2, the selected angle appears to be about 0°.

In embodiments of the present invention in which the front-accessible bevel locking system is incorporated into a miter saw, there is also provided a work surface 25 and support arm 35, rotatably secured to a worktable 200. The support arm 35 is attached to the work surface 25 such that the support arm 35 may be used to rotate the work surface 25 (in the directions indicated by the arrow B in FIG. 2) on top of the worktable 200 and beneath the power tool 45, for example, in order to make miter angle cut. The support arm 35 is also secured, at an end away from a user, to the power tool 45. The bevel locking system 15 is adjacent to and attached to the support arm 35, thus providing an operator with easy access to the bevel locking system 15.

Users of the power tool 45 use the bevel locking system 15 primarily with a handle 100. The handle 100 of the bevel locking system 15 may also be a ball, lever arm, switch, or any other type of handle known in the art. The handle 100 is secured to a bevel lock lever 70 as shown in more detail in FIGS. 3-6. In some embodiments, the handle 100 may be disposed (from the point of view of a user) to the left of the support arm 35, rather than to the right of the support arm 35

(see FIGS. 11-13). In addition, the handle 100 may unlock by being pressed downwardly, rather than by being lifted upwardly as shown in the embodiment of FIGS. 1-2. The present invention should be understood to include a variety of such variations in the position and movement of the handle 100.

Referring to FIGS. 3-6, a first end of the bevel lock lever 70 is integrated with the handle 100, and may in some embodiments serve itself as the handle 100. A second end of the bevel lock lever 70, opposite the first end, has an aperture 55 (shown in FIG. 6). In the embodiment shown in FIG. 6, the aperture has a hexagonal shape. In addition, in the embodiment of FIG. 6, the support arm 35 has a bracket 50, aligned with the aperture 55, and adapted to receive a cam shaft 65, which extends in a direction generally perpendicular to the support arm 35. The cam shaft follower 40 and the bevel lock lever 70 are secured together with the cam shaft 65 to the bracket 50 with the nut 90 and bolt 60 (other fasteners are, of course, possible). A perspective view of the portion of the bevel locking system 15 shown disassembled in FIGS. 5 and 6 is shown assembled in FIGS. 3 and 4.

A second embodiment of the present invention is shown in FIGS. 11-13. In the second embodiment shown in FIGS. 11A-B, the handle 100 is replaced with a bevel lock lever 70', which functions as both a handle and a bevel lock lever in the second embodiment. As shown in FIGS. 11-13, in the second embodiment, the bevel locking system 15' is mounted to the left side of the support arm 35. A user of the bevel locking system 15' presses downwardly on the bevel lock lever 70' to put the bevel locking system 15' in the locked position.

The bevel locking system 15' for the second embodiment differs from the bevel locking system 15 of the first embodiment in several important respects. The cam shaft follower 40 of the first embodiment is replaced instead with a cam follower 40' (further described in connection with the link rod 20' below). The interior of the cam follower 40' has a D-like shape, which is most evident in the side view of the second embodiment shown in FIG. 13. In addition, there is no cam shaft 60 offset from the cam axis in the second embodiment; rather, there is a cam pin 60' which fastens the entire assembly—including bevel lock lever 70', cam collar 65', and stop plate 80'—together. The cam pin 60' has an eccentric or elongated shape.

In the first embodiment of FIGS. 3-6, the radial distance between the cam axis and the edge of the cam shaft 65 varied with rotational angle around the cam axis because the cam shaft 65 was offset from the axis (shown most clearly in FIG. 6). In the second embodiment of FIGS. 11-13 (see, in particular, FIGS. 12 and 13), the radial distance between the cam axis and the edge of the cam collar 65' varies, producing a similar effect, but without an offset from the cam axis. The eccentric shape of the cam collar 65' and the cam follower 40' effectively achieve an axial movement of the cam follower 40' with rotation of the cam collar 65' around the cam axis. As shown in FIGS. 12 and 13, the link rod 20' is bolted to the cam follower 40' so that axial movement of the cam follower 40' results in axial movement of the link rod 20'.

Locking action is achieved by a longitudinal shifting of the link rods 20 and 20'. In the first embodiment, the cam shaft 65 is slightly offset from the rotational axis of the bevel lock lever 70. Thus, rotation of the bevel lock lever 70 is effective for moving the cam shaft 65 into a position in which the cam shaft follower 40 will be pushed or pulled either toward or away from the user. When the bevel lock lever 70 is rotated into a locking position as in FIG. 9, the cam shaft 65 pulls the length of the cam shaft follower 40, the link rod 20 (to which the cam shaft follower 40 is fixed), and a flanged nut 10 mounted at the end of the link rod 20. In this manner the flanged nut 10 is pressed up against an outside plate of a pivot support housing 110 for the power tool 45, and friction between the flanged nut 10 and the outside plate is effective for holding the power tool 45 at a particular bevel angle.

In the first embodiment shown in FIGS. 3-6, the cam shaft follower 40 extends in an axial direction, generally parallel to the support arm 35 as illustrated in FIGS. 3 and 5. The cam shaft follower 40 extends beneath the work surface 25, with the end of the cam shaft follower 40 having an aperture for receiving a dowel pin 30, the dowel pin 30 being transverse to both the cam shaft follower 40 and a link rod 20, thereby securing the cam shaft follower 40 to a front side of the link rod 20. The link rod 20 also extends rearwardly continuing from the end of the cam shaft follower 40 generally parallel to the support arm 35 and through a channel 95 of a pivot support housing 110 secured to the worktable 200, and a support 105 for supporting the power tool 45. The end of the link rod 20 is threaded to receive a washer 150 and a flanged nut 10 for movably securing the locking mechanism 15 to an outside plate of the support 105.

FIGS. 7-10 detail the movement of the link rod 20 with the bevel lock lever 70 between a locked and an unlocked position. In the unlocked position (FIG. 7), there is a first space 115 between the pivot support housing 110 and the support 105 and a second space 125 between the washer 150, nut 10 and the outside plate of the support 105. In the unlocked position, the power tool 45 may rotate about the pivot support housing 110 to various tilt or bevel positions for bevel angle cuts. Once a bevel or tilt position has been selected, the handle 100 is moved downwardly towards the plane of the work surface 25 such that the handle 100 extends substantially parallel to the link rod 20 in the locked position shown in FIG. 9. As described above, when the handle 100 is moved downwardly, the cam shaft 65 pulls the cam shaft follower 40, and in turn the link rod 20 in an axial direction towards the handle 100, as shown in FIGS. 7 and 9. Subsequently, the support 105 is pulled into contact with the pivot support housing 110 by the flanged nut 10. This movement eliminates the spaces 115, 125, thereby locking the support 105, and consequently the bevel angle of the power tool 45, into a secured position for a bevel angle cut. To release the locking mechanism, the handle 100 is moved upwardly away from the work surface 25, thereby releasing the tension between the pivot support housing 110 and the support 105.

A second embodiment of the present invention is shown in FIGS. 11-13. As shown in FIGS. 11A-B, the link rod 20 is replaced by a link rod 20' which extends beneath the work surface 25' from the rear side with the pivot support housing 110', to the front side with the bevel lock lever 70'. Advantageously, the link rod 20' is partially enclosed by a pipe 85', which protects the link rod 20', and provides mechanical support to the work surface 25'. The cam shaft follower 40, which extends beneath substantially the entire length of the worktable 100 in the first embodiment, is shortened in the second embodiment to a length only about twice as long as the diameter of the cam collar 65'. Two prongs extend from the cam follower 40', allowing the link rod 20' to be secured to the cam follower 40' with a suitable fastener, such as a bolt or screw (see FIGS. 12 and 13).

An additional advantage of the embodiment shown in FIGS. 11-13 is the support bracket 50', which is mounted to the support arm 35 (not shown in FIGS. 11A-B) by the screws 195'. The support bracket 50' attaches to the work surface 25' and rotatably supports cam shaft pin 60' and all its surrounding components. Referring to FIG. 12, the spacer 160' bears against the support bracket 50' so that the pipe 85' bears against a first spacer 160' towards an end of the pipe 85' closest to a user, and against a second spacer 160' at a second end away from the user. Both spacers are visible in FIGS. 11A-B. The pipe 85' transfers pressure to the rear and keeps work surface 25' from flexing and warping. The stop plate 80' is keyed to the cam shaft pin 60' and restricts the rotation of components by contacting the work surface 25' when rotated to the unlocked position and when rotated to the locked position (see FIG. 13).

In the version of the second embodiment shown in FIG. 11A, the portion of the bevel locking system 15' disposed away from a user includes a bearing plate 180' and brake pad 170' in addition to a washer 150' and nut 91', as were used in the first embodiment. The rear portion of the version of the second embodiment shown in FIG. 11B is the same as the rear portion of the version of the second embodiment shown in FIG. 11A, except that, in the version shown in FIG. 11B, two bearing plates 180' and two different brake pads 170' and 175' are used along with bearing plate spacers 190' (which hold the bearing plates 180' apart). In FIG. 11B, the two brake pads 170' and 175' may be made from either the same or of different materials. For example, the outer brake pad 175' might be made from a high friction asbestos and steel composite material, such as are commonly found in automobile brake shoes. The inner brake pad 170' could be made from the same material, or from a material such as steel. As is known to those of ordinary skill in the art, different materials may be used in order to achieve different physical advantages, for example, of high friction, light weight, or durability. In both of these versions of the second embodiment, the bearing plates 180' and brake pads 170' are used to increase the friction between the support 105' and the pivot support housing 110', in order to hold more securely the power tool 45 at a selected bevel angle.

In FIG. 11B, the link rod 20' pulls the nut 91', which presses the washer 150' and outer brake pad 170' against the outer bearing plate 180'. The outer bearing plate 180' flexes against the inner brake pad 170', which contacts the inner bearing plate 180'. The inner bearing plate 180', in turn, is pressed to the support 105', so that, when the bevel lock lever 70' is in the locked position, the entire bevel locking system 15' is compressed, effectively holding the power tool 45 at a fixed bevel angle.

Although two embodiments are particularly described and disclosed herein, those of ordinary skill in the art will understand and appreciate how other embodiments of the present invention are possible. In particular, a geometrical arrangement of the cam axis or the link rod different from that shown or described in either the first embodiment or the second embodiment may be preferable to the specific arrangements disclosed herein. A bevel locking system in which the bevel lock lever is disposed between the front end and the rear end of a power tool would also be understood by one of ordinary skill in the art from the embodiments disclosed and described, and a bevel lock lever on a left side or a right side of a power tool, which are also front-accessible to a user, are part of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A locking system for use with a power tool, comprising:
    a turntable;
    a power tool support pivotably mounted to said turntable, said power tool support including (i) a wall defining a first arcuate opening therein, and (ii) a first bearing plate defining a second arcuate opening therein, said first bearing plate being mounted in relation to said wall so that said second arcuate opening is aligned with said first arcuate opening;
    an actuator movably mounted in relation to said turntable;
    a linkage having a first end portion coupled to said actuator and a second end portion extending through both said first arcuate opening and said second arcuate opening, said linkage including a first brake pad supported on said second end portion,
    wherein (i) movement of said actuator from a first location to a second location causes movement of said linkage from a first position to a second position, and (ii) movement of said actuator from said second location to said first location causes movement of said linkage from said second position to said first position,
    wherein movement of said linkage from said first position to said second position causes said first brake pad to be moved toward said first bearing plate so that pivoting of said power tool support in relation to said turntable is inhibited, and
    wherein movement of said linkage from said second position to said first position causes said first brake pad to be moved away from said first bearing plate so that pivoting of said power tool support in relation to said turntable is enabled,
    wherein said power tool support further includes a second bearing plate having a third arcuate opening defined therein,
    wherein said second bearing plate is mounted in relation to said first bearing plate so that said third arcuate opening is aligned with said second arcuate opening, wherein said linkage further extends through said third arcuate opening, and wherein said linkage further includes a second brake pad supported on said second end portion of said linkage and interposed between said first bearing plate and said second bearing plate.

2. The locking system of claim 1, wherein:
said linkage further includes a nut secured to said second end portion of said linkage, and
said first brake pad is interposed between said first bearing plate and said nut.

3. The locking system of claim 1, wherein said first brake pad includes a high friction asbestos material.

4. The locking system of claim 1, wherein:
said actuator includes a lever pivotably mounted in relation to said turntable, and
said lever is coupled to said first end portion of said linkage.

5. The locking system of claim 1, wherein said linkage further includes at least one spacer interposed between said first bearing plate and said second bearing plate.

6. The locking system of claim 1, wherein movement of said linkage from said first position to said second position further causes said second brake pad to be moved toward said second bearing plate.

7. The locking system of claim 1, wherein each of said first brake pad and said second brake pad includes a high friction asbestos material.

8. A locking system for use with a power tool, comprising:
a turntable;
a power tool support pivotably mounted to said turntable, said power tool support including (i) a wall defining a first opening therein, and (ii) a first bearing plate defining a second opening therein, said first bearing plate being mounted in relation to said wall so that said second opening is aligned with said first opening;
an actuator movably mounted in relation to said turntable;
a linkage having a first end portion coupled to said actuator and a second end portion extending though both said first opening and said second opening, said linkage including a first brake pad supported on said second end portion, wherein movement of said actuator causes movement of said linkage, and wherein movement of said linkage causes said first brake pad to be advanced toward said first bearing plate so as to cause pivoting of said power tool support in relation to said turntable to be inhibited, wherein said power tool support further includes a second bearing plate having a third opening defined therein, wherein said second bearing plate is mounted in relation to said first bearing plate so that said third opening is aligned with said second arcuate opening, wherein said linkage further extends though said third opening, and wherein said linkage further includes a second brake pad supported on said second end portion of said linkage and interposed between said first bearing plate and said second bearing plate.

9. The locking system of claim 8, wherein:
said linkage further includes a nut secured to said second end portion of said linkage, and
said first brake pad is interposed between said first bearing plate and said nut.

10. The locking system of claim 8, wherein said first brake pad includes a high friction asbestos material.

11. The locking system of claim 8, wherein:
said actuator includes a lever pivotably mounted in relation to said turntable, and
said lever is coupled to said first end portion of said linkage.

12. The locking system of claim 8, wherein said linkage further includes at least one spacer interposed between said first bearing plate and said second bearing plate.

13. The locking system of claim 8, wherein movement of said linkage also causes said second brake pad to be advanced toward said second bearing plate.

14. The locking system of claim 8, wherein each of said first brake pad and said second brake pad includes a high friction asbestos material.

* * * * *